(12) United States Patent
Oliver et al.

(10) Patent No.: US 6,265,706 B1
(45) Date of Patent: Jul. 24, 2001

(54) EDGE TO EDGE IMAGE SENSOR AND NAVIGATOR FOR PORTABLE SCANNER

(75) Inventors: Thomas C. Oliver; David C. Rohn, both of Fort Collins; Eugene A. Miksch, Loveland, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/352,513

(22) Filed: Jul. 12, 1999

(51) Int. Cl.$^7$ .............................. H04N 1/024; H04N 1/04
(52) U.S. Cl. ......................... 250/208.1; 358/473
(58) Field of Search .................. 250/208.1, 234, 250/235, 556, 557; 235/462.01, 472.01; 382/312, 313, 314, 318, 321; 358/473, 474, 494

(56) References Cited

U.S. PATENT DOCUMENTS

| | | | |
|---|---|---|---|
| 5,306,908 | 4/1994 | McConica et al. | 250/234 |
| 5,381,020 | 1/1995 | Kochis et al. | 250/566 |
| 5,552,597 | 9/1996 | McConica | 250/234 |
| 5,578,813 | 11/1996 | Allen et al. | 250/208.1 |
| 5,586,212 | 12/1996 | McConica et al. | 385/146 |
| 5,644,139 | 7/1997 | Allen et al. | 250/557 |
| 5,686,720 | * 11/1997 | Tullis | 250/208.1 |
| 5,729,008 | * 3/1998 | Blalock et al. | 250/208.1 |
| 5,825,044 | * 10/1998 | Allen et al. | 250/557 |
| 5,994,710 | * 11/1999 | Knee et al. | 250/208.1 |
| 6,005,681 | * 12/1999 | Pollard | 358/473 |

* cited by examiner

Primary Examiner—Stephone B. Allen

(57) ABSTRACT

A portable scanner may comprise a first image detector and a second image detector placed in spaced apart relation to the first image detector. A plurality of position detectors is located between the first image detector and the second image detector for detecting a position of the portable scanner.

A portable scanner may also comprise an image detector having a first side and a second side opposite said first side. A first plurality of position detectors is located adjacent the first side of the image detector. A second plurality of position detectors is located adjacent the second side of the image detector.

27 Claims, 5 Drawing Sheets

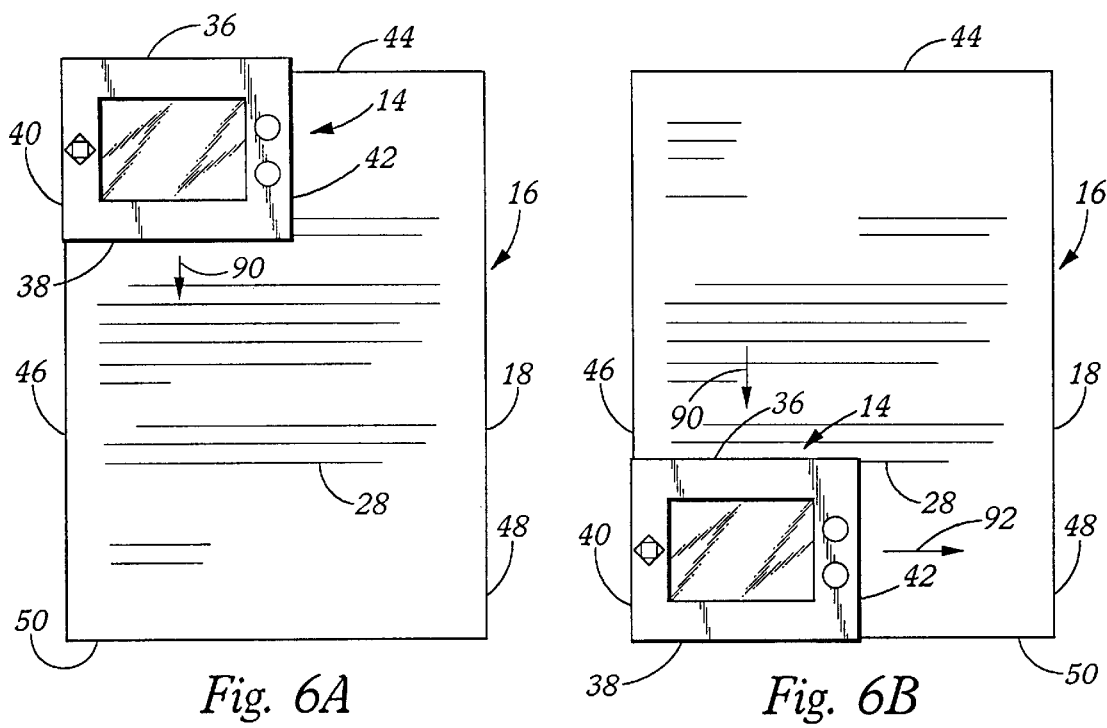
Fig. 6A
Fig. 6B
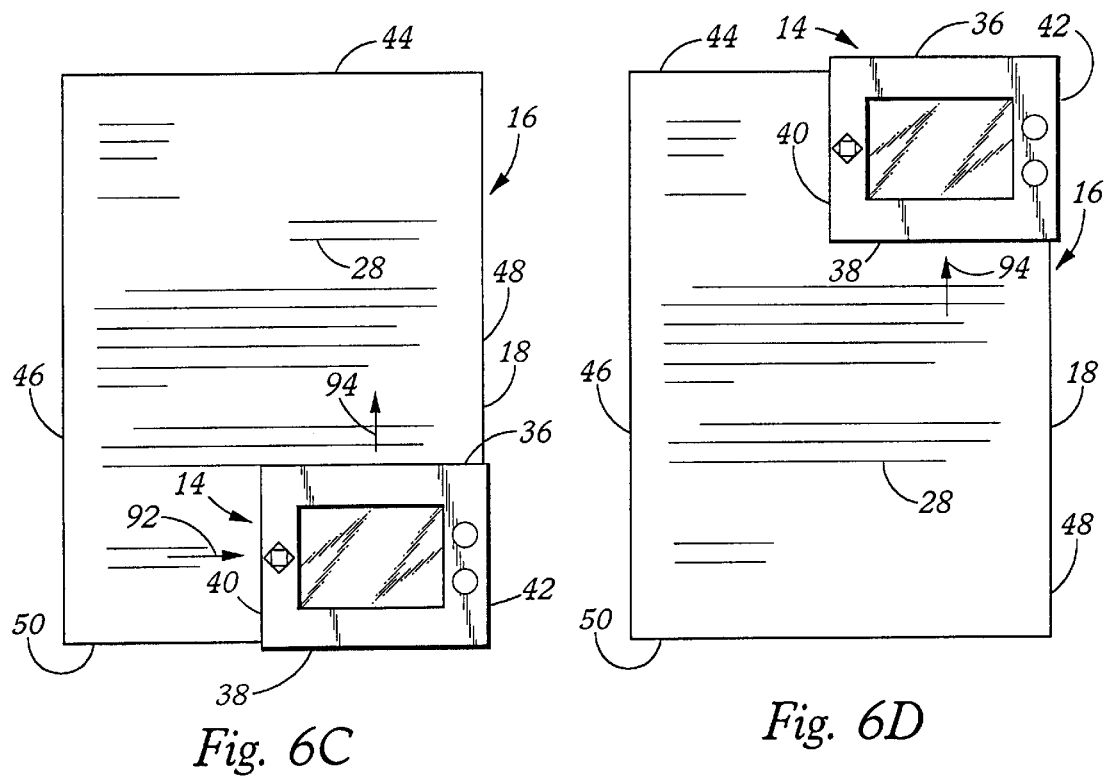
Fig. 6C
Fig. 6D

EDGE TO EDGE IMAGE SENSOR AND NAVIGATOR FOR PORTABLE SCANNER

FIELD OF THE INVENTION

This invention relates to portable image scanners in general and more specifically to an image and position sensor system for a portable scanner.

BACKGROUND OF THE INVENTION

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the portable hand-scanner may include an on-board data storage system for storing the image data. The image data may then be downloaded to a separate computer after the scanning operation is complete by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to direct and focus the image of the illuminated scan line onto the surface of the detector. The optical system may also comprise a reduction optics system for reducing the reflected light onto a very small detector.

The photosensitive detector used to detect the image light focused thereon by the optical system may be a contact image sensor, an array of photodetectors which act together to capture the image of a scan line. A typical individual photodetector changes electrical resistance as it is exposed to light. As the intensity of the light reflected from the image onto the photodetector changes, the electrical current passing through the photodetector varies. Thus a photodetector may be used to detect light and dark regions on an image.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals in essentially three steps. First, each photodetector converts the light it receives into an electric charge. Second, the charges from the photodetectors are converted into analog voltages by an analog amplifier. Finally, the analog voltages are digitized by an analog-to-digital (A/D) converter. The digital data then may be processed and/or stored as desired.

A typical hand-held optical scanner may also include a position sensing system to keep track of the scanners position with respect to the object. A position sensing system may comprise several optical detectors, or navigators, which capture the image of several target locations on the object. The position sensing system allows a portable scanner to image an object or document which is larger and wider than the scanner. As the portable scanner is moved back and forth across the object to scan all areas of the object, the position sensing system keeps track of the position of the scanner. The various scanned strips may then be "stitched" together using the position information collected by the position sensing system.

One type of optical position sensor is a two dimensional array of optical detectors which generates image data representing a two-dimensional portion of the surface of the object. A processor analyzes the image data to identify the positions of distinct features located on the surface of the object relative to the optical sensor. As the scanner is moved relative to the object, the positions of these distinct features relative to the optical sensor move accordingly. The processor measures these position changes to determine the displacement and direction of movement of the scanning device relative to the surface of the object. The processor may also integrate the displacement to determine the velocity of the scanner relative to the surface of the object. Examples of position sensors, or navigators, that image two-dimensional areas of an object are disclosed in U.S. Pat. No. 5,644,139 of Allen, et al., for "Navigation Technique for Detecting Movement of Navigation Sensors Relative to an Object," and U.S. Pat. No. 5,578,813 of Allen, et al., for "Freehand Image Scanning Device Which Compensates for Non-linear Movement," both of which are hereby incorporated by reference for all that they disclose.

One portable scanner includes a contact image sensor and two navigators. The two navigators are located on one side of the contact image sensor, forming a line parallel to the contact image sensor. The two navigators are placed just close enough together so that the ends of the contact image sensor extend beyond the navigators. With this scanner configuration it can be very difficult to scan an entire object, including the edges, without rotating the scanner by at least ninety degrees. With the first scanner described the navigators will be moved off the object when the contact image sensor is moved adjacent to a top or bottom edge of the object, since the navigators are located on one side of the contact image sensor. With the second scanner described a navigator will be moved off the object when scanning the side edges of the object, since the navigators are located beyond the ends of the contact image sensor. If the navigators move off the object the position information is lost and the portable scanner may be unable to stitch the scanned strips together. Typical stitching software has a difficult time stitching scanned strips together if the portable scanner has been rotated a large amount, such as by ninety degrees. For this software, the portable scanners described above cannot fully image the edges of an object.

A need therefore exists for an image and position sensor which enable a portable scanner to fully scan an object, including the edges.

SUMMARY

To assist in achieving the aforementioned need, the inventors have devised an image and position sensor system which allows the contact image sensor system to scan an entire object while keeping at least two navigators on the object at once. In a first preferred exemplary configuration, the image and position sensor system includes two image detectors and two position detectors (hereinafter referred to as a dual-image detector dual-position detector system). In a second exemplary configuration, the image and position sensor system includes one image detector and four position detectors (hereinafter referred to as a single-image detector quad-position detector system).

A portable scanner according to the first configuration having features of the present invention may comprise a first image detector and a second image detector placed in spaced apart relation. A plurality of position detectors is located between the first image detector and the second image detector for detecting a position of the portable scanner.

The first and second image detectors may comprise linear arrays of photodetectors, placed parallel to each other. The plurality of position detectors may comprise two optical position detectors, wherein the two optical position detectors form a line which is parallel to the first and second image detectors.

A portable scanner according to the second configuration may comprise an image detector with a first plurality of position detectors located adjacent one side and a second plurality of position detectors located adjacent the other side. The image detector may comprise a contact image sensor elongated along a first axis. The first plurality of position detectors are linearly arranged along a second axis, and the second plurality of position detectors are linearly arranged along a third axis. The first, second and third axes are placed in parallel, spaced apart relation.

The contact image sensor has a first end extending beyond the first and second pluralities of position detectors in a first direction, and a second end extending beyond the first and second pluralities of position detectors in a second direction, wherein the first direction is opposite the second direction and the first and second directions are parallel to the first axis.

The portable scanner may further comprise a printed circuit board, to which the image detector and position detectors are mounted and electrically connected.

The portable scanner may also comprise a planar display panel positioned adjacent the image detector and position detectors. The planar display panel is oriented substantially parallel to a plane formed by the position detectors.

BRIEF DESCRIPTION OF THE DRAWING

Illustrative and presently preferred embodiments of the invention are shown in the drawing, in which:

FIGS. 6A–6D are top views illustrating the placement of the portable scanner of FIG. 2 over the corners of a document in order to obtain full page coverage;

DESCRIPTION OF THE PREFERRED EMBODIMENT

Figure 1:
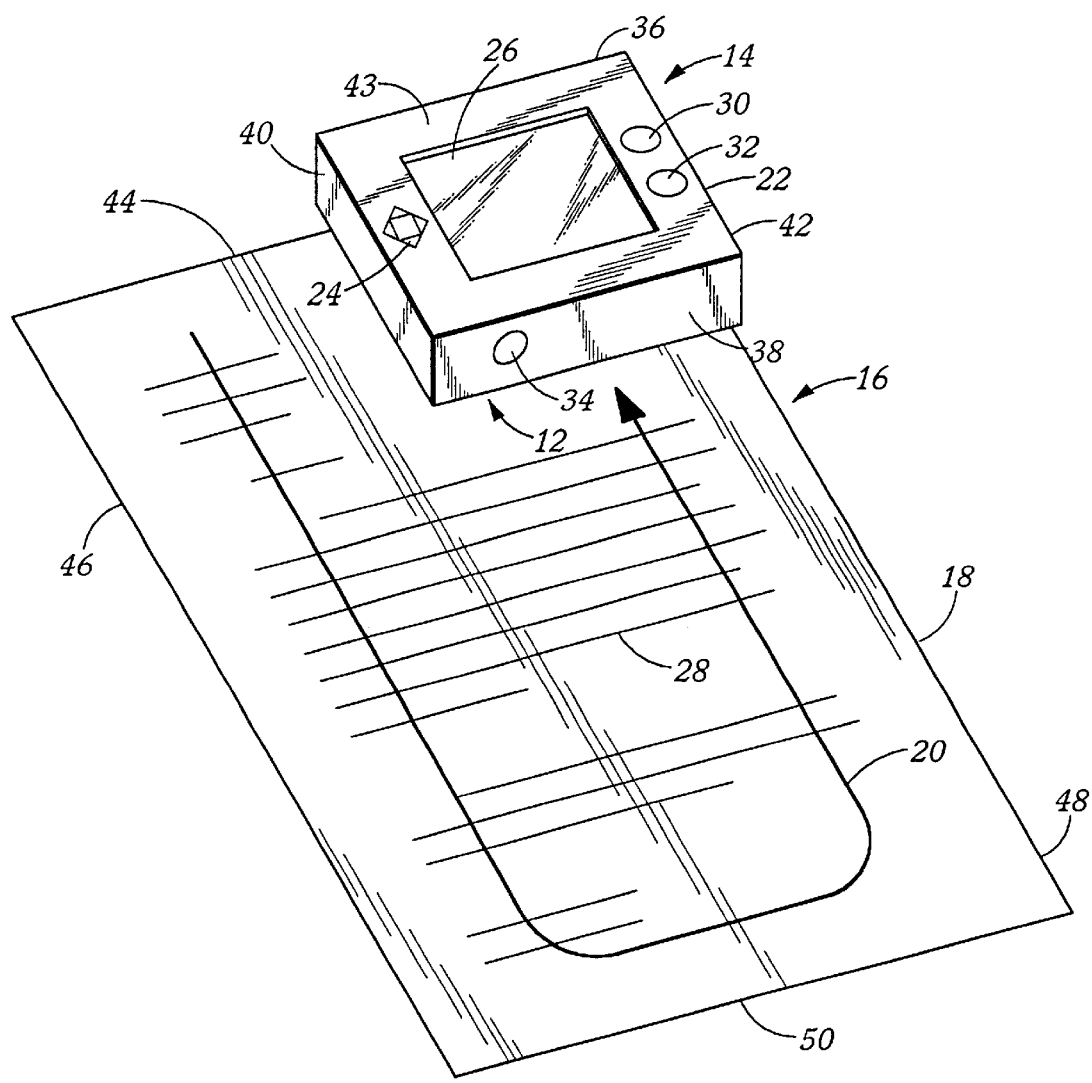
FIG. 1 is a perspective view of a portable scanner having a dual-CIS dual-navigator system to enable full page coverage, illustrating an edge to edge scanning operation.
Figure 4:
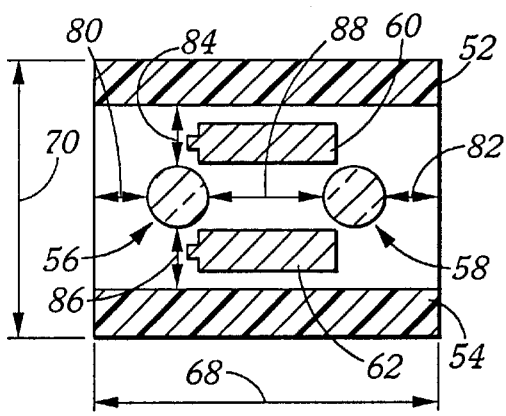
FIG. 4 is a cross-sectional top view of the portable scanner of FIG. 2 taken along line 4.

An edge to edge image sensor and navigator system 12 (FIG. 1) according to the present invention may be used in a hand-held or portable scanner 14 to scan an object 16, such as a document 18 with written text 28 provided thereon. For example, the entire document 18 may be scanned by moving the portable scanner 14 over the document 18 along a meandering or curvilinear scanning path 20. As will be explained in greater detail below, the edge to edge image sensor and navigator system 12 associated with the portable scanner 14 enables full page coverage of the document 18, including all edges 44, 46, 48, and 50. The edge to edge image sensor and navigator system 12 significantly simplifies full page scanning, by allowing the contact image sensors (e.g., 52 and 54, FIG. 4) to be moved over the edges 44, 46, 48, and 50 of the document 18 while keeping the navigators (e.g., 56 and 58) on the document 18.

Figure 2:
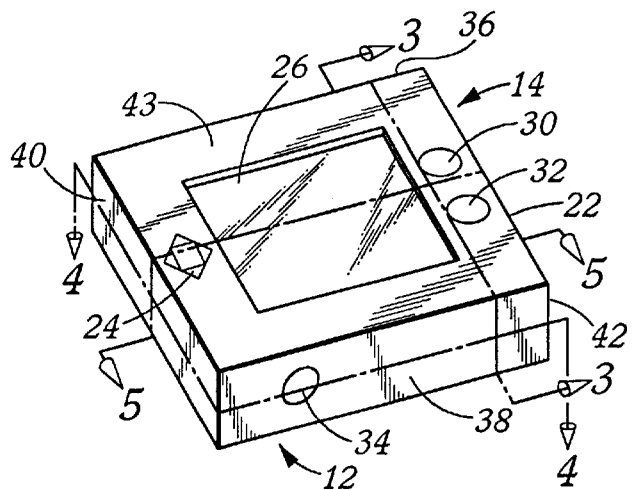
FIG. 2 is a perspective view of a portable scanner having a dual-CIS dual-navigator system.

Referring now to FIG. 2, one embodiment of the portable scanner 14 having an edge to edge image sensor and navigator system 12 may comprise a main housing portion 22 sized to receive the contact image sensors 52 and 54, the navigators 56 and 58, and the various electronic components and other devices (not shown) required for the operation of the portable scanner 14. For example, in addition to housing the various electronic components that may be required or desired for the operation of the portable scanner 14, the main housing portion 22 may also be provided with a display device 26, along with various buttons or switches 24, 30, 32, and 34 to control the function and operation of the portable scanner 14. The main housing portion 22 may also be sized to receive a suitable power source, such as a battery 60 and 62, to provide electrical power to the portable scanner 14.

Figure 3:
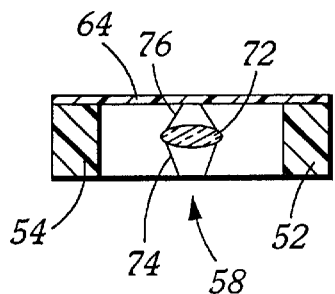
FIG. 3 is a cross-sectional side view of the portable scanner of FIG. 2 taken along line 3.
Figure 5:
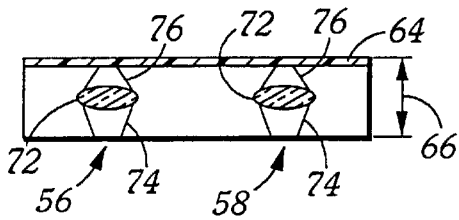
FIG. 5 is a cross-sectional front view of the portable scanner of FIG. 2 taken along line 5.
Figure 7:
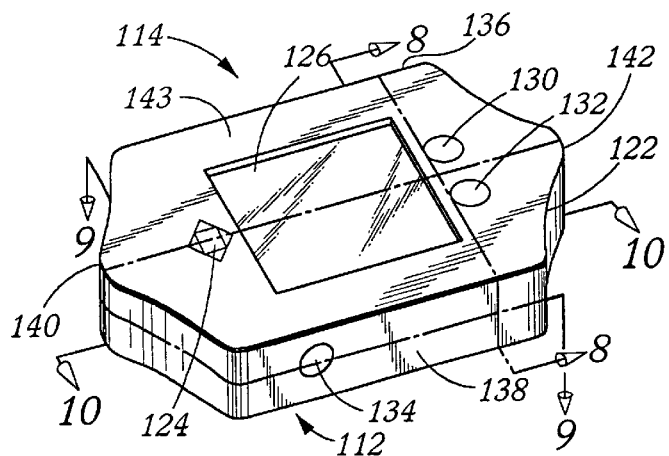
FIG. 7 is a perspective view of a portable scanner having a single-CIS quad-navigator system.
Figure 8:
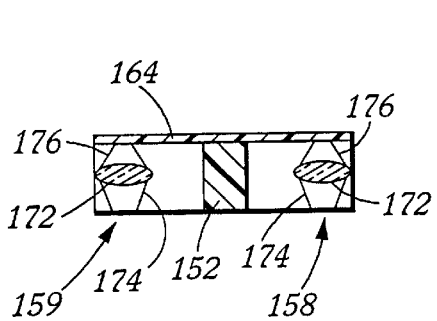
FIG. 8 is a cross-sectional side view of the portable scanner of FIG. 7 taken along line 8.
Figure 9:
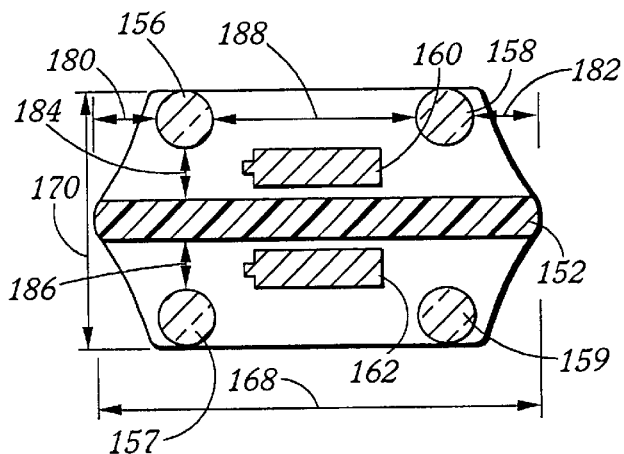
FIG. 9 is a cross-sectional top view of the portable scanner of FIG. 7 taken along line 9.
Figure 10:
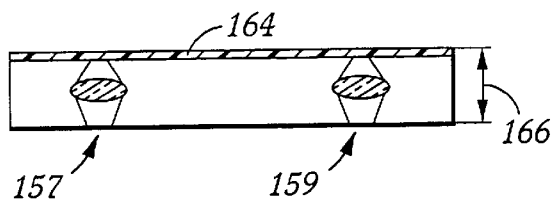
FIG. 10 is a cross-sectional front view of the portable scanner of FIG. 7 taken along line 10.

The main housing portion 22 is configured with slots and openings (not shown) adjacent the contact image sensors 52 and 54 (FIGS. 3–5) and the navigators 56 and 58 to allow light to pass in and out of the portable scanner 14. The main housing portion 22 is also sized to receive an illumination system (not shown) which illuminates a scan region on the document 18 adjacent the contact image sensors 52 and 54. The illumination system may also illuminate portions of the document 18 adjacent the navigators 56 and 58.

In one embodiment, the main housing portion 22 is configured so that the display device 26 and most of the control buttons 24, 30, and 32 are located on the top 43 of the portable scanner 14. This enables the user to hold the portable scanner 14 by the front and back sides 38 and 36, respectively, while scanning, thus keeping fingers off the display device 26 and most of the control buttons 24, 30, and 32. The main housing portion 22 also has a low profile, wherein the sides 36, 38, 40, and 42, are shorter than the top 43 is wide or deep, reducing the possibility of inadvertently tilting the portable scanner 14 during a scanning operation.

The main housing portion 22 may also be configured with a single printed circuit board 64, to which the contact image sensors 52 and 54 and the navigators 56 and 58 are mounted and electrically connected.

As was briefly mentioned above, the edge to edge image sensor and navigator system 12 significantly aids full page scanning of a document 18 with a portable scanner 14. The contact image sensors 52 and 54 which capture the image of the document 18 may be moved over the edges 44, 46, 48, and 50 of the document 18 while keeping the navigators 56 and 58 over the document 18. This allows the multiple scanned strips or swaths to be "stitched" together by processing software. If at least one, and preferably more, of the navigators 56 and 58 are not kept on the document 18 at all times during the scanning operation, the location of the scanned swath relative to other scanned swaths will be unknown, and the software will be unable to combine them into a complete document image.

The edge to edge image sensor and navigator system 12 thus enables a portable scanner 14 to scan a full page, including all edges, without requiring inconvenient rotation of the portable scanner 14 which is difficult to perform and which may prevent the stitching software from operating correctly. The edge to edge image sensor and navigator system 12 allows a user to move part of the contact image sensors 52 and 54 over the edges 44, 46, 48, and 50 and off the document 18 to ensure full coverage while keeping the navigators 56 and 58 on the document 18.

The low profile of the main housing portion 22 greatly simplifies use of the portable scanner 14, stabilizing the scanner 14 on the document 18 and preventing unwanted tilting which would distort the final image or prevent proper scanning. The low, stable design of the portable scanner 14 makes it very easy to control during a scanning operation.

The placement of the display device 26 and most of the control buttons 24, 30, and 32 on the top 43 of the portable scanner 14 provides protection, allowing the user to place his or her fingers on the sides 36 and 38 of the scanner 14. This prevents the display device 26 and control buttons 24, 30, and 32 from becoming damaged or dirty, and provides a secure location for the user to grasp.

The single, low tech printed circuit board 64 decreases the cost of the portable scanner 14 over designs which require multiple printed circuit boards. The single printed circuit board 64 aids alignment and mounting of the electronic components and simplifies overall assembly of the portable scanner 14, as well as reducing overall size and cost of the portable scanner 14.

In one preferred embodiment, the edge to edge image sensor and navigator system 12 may comprise two image detectors 52 and 54, with at least two position sensors 56 and 58 located between the image detectors 52 and 54. The image detectors 52 and 54 may comprise elongated, linear arrays of photodetectors, or contact image sensors, placed in parallel, spaced apart relation. The position sensors 56 and 58 preferably comprise two dimensional arrays of photodetectors, or navigators, placed equidistant between the contact image sensors 52 and 54. The two navigators 56 and 58 form a line which is parallel to the lines formed by each of the contact image sensors 52 and 54. The contact image sensors 56 and 58 preferably extend to or near to the left and right sides 40 and 42, respectively, of the portable scanner 14, while the navigators 56 and 58 are inset from the sides 40 and 42 so that the ends of the contact image sensors 56 and 58 extend beyond the navigators 56 and 58. The ends of the contact image sensors 56 and 58 may then extend over the sides 46 and 48 of the document 18 while the navigators 56 and 58 remain on the document 18.

The portable scanner 14 having an edge to edge image sensor and navigator system 12 may be operated as follows to scan an object 16, such as document 18 with written text 28 thereon. As a first step, the user (not shown) would set up or initialize the portable scanner 14 to perform the scanning operation by actuating the appropriate buttons or switches (e.g., 24, 30, 32, and 34) in accordance with the particular operational sequence for the specific scanner device. For example, a scan initiation button 34 may be located upon the front side 38 of the portable scanner 14, so that the user can easily hold down the scan initiation button 34 with a thumb while scanning the document 18.

The user holds the contact surface or face (not shown) of the portable scanner 14 against the document 18 and initiates the scanning operation. The user then moves the portable scanner 14 across the document 18 as the edge to edge image sensor and navigator system 12 captures the scan swaths and location information. Stitching software, either in the portable scanner 14 or in an external computer, can then reassemble a unified image of the document 18 from the scan swaths captured by the contact image sensors 52 and 54 and from the location information captured by the navigators 56 and 58.

Having briefly described the edge to edge image sensor and navigator system 12 and its use in a portable scanner 14, as well as some of its more significant features and advantages, the various embodiments of the edge to edge image sensor and navigator system 12 will now be described in detail. However, before proceeding with the detailed description it should be noted that the configurations of the edge to edge image sensor and navigator system 12 shown and described herein are exemplary. It should also be noted that while the portable scanner 14 is shown and described herein as it may be used to scan an object 16, such as a document 18 with written text 28 thereon, it is not limited to use with any particular type of object 16. Indeed, the portable scanner 14 may be used to scan almost any type of object imaginable.

Similarly, the portable scanner 14 may include any type of image detector now known or that may be developed in the future, such as a contact image sensor, a charge-coupled device, a CMOS detector array, etc. The portable scanner 14 may include any type of position detector now known or that may be developed, such as an optical detector or a mechanical detector like a track ball or depth sensing stylus. The portable scanner 14 may also include any type of optical system, such as a reduction optics system or a contact optics system like a gradient index lens. Accordingly, the edge to edge image sensor and navigator system 12 according to the present invention should not be regarded as limited to the particular type of portable scanner and applications shown and described herein.

With the foregoing considerations in mind, one embodiment of the edge to edge image sensor and navigator system 12 is shown and described herein as it could be used in a portable or hand-held image scanner 14 which may be used to scan an object 16, such as a document 18 with written text 28 thereon. See FIG. 1. In order to scan the entire document 18, it may be necessary for the user to move the portable scanner 14 along a curvilinear or meandering scanning path 20. The edge to edge image sensor and navigator system 12 allows the image data obtained along the meandering or curvilinear scanning path 20 to be "stitched" together to provide image data representative of the entirety of the scanned object 16. Exemplary stitching algorithms are disclosed in U.S. Pat. No. 5,578,813 of Allen, et al., for "Freehand Image Scanning Device which Compensates for Non-Linear Movement," which is specifically incorporated herein by reference for all that it discloses. However, since the details of the stitching algorithm that may be used in such a portable scanner 14 are not necessary to understand or practice the present invention, the particular stitching algorithm that may be utilized in a portable scanner 14 will not be described in further detail herein.

Referring now primarily to FIGS. 2–5, a portable scanner 14 with a preferred embodiment of the edge to edge image sensor and navigator system 12 having dual contact image sensors and dual navigators may be contained in a main housing portion 22 having a top 43, bottom (not shown), left side 40, right side 42, front 38, and back 36. The main housing portion 22 has a height 66 which is less than the width 68 or depth 70 of the top 43. The resulting low profile of the portable scanner 14 provides stability and ease of use, preventing inadvertent tilting during a scanning operation. The main housing portion 22 may be formed in any suitable fashion. Preferably, the main housing portion 22 is molded of a polycarbonate material.

A display device 26 may be placed in the top 43 of the main housing portion 22 to aid the user in scanning the object 16, in viewing scanned images, or in transmitting scanned images to a remote computer. The display device 26 is sized to fit in the top 43 of the main housing portion 22 and to leave enough room for other necessary elements, such as control buttons 24, 30, and 32. The display device 26 is preferably a low cost liquid crystal display (LCD) having an adequate resolution to display scanned images and a user interface (menus, instructions, etc.)

Alternatively, the display device 26 may comprise another type of display, such as a thin-film transistor (TFT) display, a gas plasma display, etc, and may display a color image if desired, although the cost and power requirements would be increased.

A printed circuit board (PCB) 64 is located inside the main housing portion 22 near the top 43. The printed circuit board 64 is an insulating base or substrate with electrical connection pads for electronic components and one or more layers of electrical conductors printed thereon, interconnecting the electrical connection pads. The electronic components are mounted to the printed circuit board 64, simplifying assembly of the portable scanner 14. For example, the display device 26 and buttons 24, 30, and 32 may be soldered to the electrical connection pads on the top surface of the printed circuit board 64, with electronic imaging components (e.g., 52, 54, 56, and 58) soldered or formed in the bottom surface of the printed circuit board 64. The single printed circuit board 64 reduces cost and complexity of the portable scanner 14. Assembly is greatly simplified with only one printed circuit board 64 to install in the portable scanner 14, and mounting brackets and hardware requirements are reduced. The amount of electrical wiring and connectors needed in the portable scanner 14 is also reduced, lowering cost and increasing reliability.

Image detectors 52 and 54 are located in the bottom of the main housing portion 22 of the portable scanner 14, along with any required illumination systems (not shown). An illumination system shines illumination light through holes in the base of the main housing portion 22 onto a target area on the object 16. Image light (not shown) is reflected from the surface of the object 16 onto the image detectors 52 and 54, which convert the incident image light into electrical signals representative of the light and dark regions on the object 16. The image detectors 52 and 54 may produce a monochrome image, or may produce a color image using known color imaging techniques.

The image detectors 52 and 54 comprise photosensitive detector systems such as CCD or CMOS technologies, or alternate detection technologies now known or which may be developed in the future. Semiconductor photosensitive detector devices such as CCD or CMOS detectors build up electrical charges in areas exposed to light. The varying electrical charge distributed across the two-dimensional face of the semiconductor thus contains an electrical representation of the varying light intensity across the face.

In the preferred embodiment, a linear array of CMOS photodetectors are used in combination with a lens in a contact image sensor system, to be discussed in more detail hereinafter. The CMOS photodetectors (e.g., 52 and 54) are manufactured on a silicon wafer in an integrated circuit manufacturing operation. The CMOS photodetectors (e.g., 52 and 54) may then be packaged and soldered to the printed circuit board 64. During a scanning operation, the image detectors 52 and 54 are moved across the object 16 substantially perpendicularly to the line of photodetectors 52 and 54 so that a series of line images is captured. The series of line images can then be combined to form a two dimensional image, or scan swath.

The portable scanner 14 may include an optical system (not shown) to direct and focus image light onto the image detectors 52 and 54. The optical system may comprise shaped lenses or any device with the suitable optical properties. For contact image detectors the optical system preferably comprises a rod lens array, or gradient index lens. A gradient index (GRIN) lens comprises an array of glass or plastic tubes mounted side by side in a single housing. Each tube directs light by refraction due to a refractive index which smoothly varies from the center of the tube out to the edges. In a preferred embodiment, the lenses may comprise GRIN lenses such as the type sold under the name SELFOC which is a registered trademark of the Nippon Sheet Glass Company.

Alternatively, the optical system may comprise reduction optics which reduce and focus image light, allowing the image detectors 52 and 54 to be smaller than the corresponding target area of an object 16. The optical system may be mounted to the printed circuit board 64 or to the main housing portion 22 in positions 52 and 54 with any suitable mounting process, such as a thin layer of adhesive.

Position detectors 56 and 58, or navigators, are also located in the bottom of the main housing portion 22 of the portable scanner 14 in order to determine the position and orientation of the portable scanner 14 during a scanning operation. The position detectors 56 and 58 may comprise any device for detecting the position of the portable scanner 14, such as optical detectors like a CMOS detector array or CCD, or mechanical detectors like a trackball or a depth-sensing stylus.

The position detectors 56 and 58 preferably comprise two dimensional arrays of photodetectors. The main housing portion 22 may also contain an illumination system to illuminate target areas of the object 16 under the position detectors 56 and 58, if needed to reliably detect the position of the portable scanner 14. The position detectors 56 and 58 may also include lenses 72 to direct and focus navigation image light 74 and 76 from the object 16 to the photodetectors as needed. The lenses 72 may comprise any type of appropriate optics to direct, focus, or magnify as needed. For example, in one embodiment of the portable scanner 14, the lenses 72 are shaped lenses with a magnification power of about 1.4.

The position detectors 56 and 58 periodically generate image data from a small two-dimensional area of the object 16 being scanned. A computer processor in the portable scanner 14 receives this image data and identifies distinct features on the object. In the example where the object 16 is text 28 printed on a paper document 18, the distinct features may be inherent irregularities in the surface of the paper, such as paper fibers. The positions of these distinct features relative to the position detectors 56 and 58 are stored in a memory device. As the portable scanner 14 is moved relative to the object 16, the positions of these distinct features move relative to the position detectors 56 and 58. The processor compares the new positions of these distinct features to the positions stored in the memory device. Based on these comparisons, the processor is able to determine the position, direction of movement, and velocity of the portable scanner 14 to which the position detectors 56 and 58 are affixed relative to the object 16. Accordingly, the processor is able to stitch together the scanned swaths imaged by the contact image sensors 52 and 54 because the locations of the image swaths relative to each other may be readily determined.

The main housing portion 22 also contains one or more batteries 60 and 62 to power the portable scanner 14. The batteries 60 and 62 may be located in any suitable location in the portable scanner 14.

A single position detector (e.g., 56 and 58), if large enough, can be used to determine the position of the portable scanner 14. However, it is difficult to determine rotation or orientation of the portable scanner 14 with only one small position detector (e.g., 56 and 58). Therefore, it is preferable to maintain at least two position detectors 56 and 58 over the object 16 at all times. The edge to edge image sensor and navigator system 12 ensures that the contact image sensors 52 and 54 can be moved over the edges 44, 46, 48, and 50 in all directions to capture the full image of the object 16, while maintaining at least two position detectors 56 and 58 on the object 16 at all times.

In a preferred embodiment, a first contact image sensor 52 is located at or near the back side 36 of the portable scanner 14. The first contact image sensor 52 is elongated and extends between the left side 40 and the right side 42. The first contact image sensor 52 may extend to or near to the left and right sides 40 and 42 of the portable scanner 14. A second contact image sensor 54 is located at or near the front side 38 of the portable scanner 14. The second contact image sensor 54 is elongated and extends between the left side 40 and the right side 42. The second contact image sensor 54 may extend to or near to the left and right sides 40 and 42 of the portable scanner 14.

The image of the object 16 is captured mainly when the portable scanner 14 is moved up and down the object 16, substantially perpendicular to the first and second contact image sensors 52 and 54. During portions of the scanning operation when the portable scanner 14 is moving laterally back or forth across the object 16, the scanner motion is parallel to the contact image sensors 52 and 54, and very little of the document image is captured, though the position detectors 56 and 58 continue to track the movement and position of the portable scanner 14. Alternatively, if the primary scanning motion is lateral, back and forth across the object 16, the contact image sensors 52 and 54 may be rotated 90 degrees, with the first contact image sensor 52 being located along the left side 40 and the second contact image sensor 54 being located along the right side 42 of the portable scanner 14.

Two position detectors 56 and 58 are located on the bottom of the portable scanner 14 between the contact image sensors 52 and 54. A first position detector 56 is located near the left side 40 of the portable scanner 14, spaced equidistantly between the first and second contact image sensors 52 and 54. The first position detector 56 is preferably set back from the left side 40 so that the contact image sensors 52 and 54 extend a small distance 80 past the first position detector 56 toward the left side 40. This allows the left side of the contact image sensors 52 and 54 to be extended slightly over the left edge 46 of the object 16 during a scanning operation and still keep the first position detector 56 on the object 16.

A second position detector 58 is located near the right side 42 of the portable scanner 14, spaced equidistantly between the first and second contact image sensors 52 and 54. The second position detector 58 is preferably set back from the right side 42 so that the contact image sensors 52 and 54 extend a small distance 82 past the second position detector 58 toward the right side 42. This allows the right side of the contact image sensors 52 and 54 to be extended slightly over the right edge 48 of the object 16 during a scanning operation and still keep the second position detector 58 on the object 16.

The position detectors 56 and 58 are spaced a small distance 84 from the first contact image sensor 52 and a small distance 86 from the second contact image sensor 54, with the two distances 84 and 86 preferably being substantially equal. The first contact image sensor 52 may be extended slightly over the top edge 44 of the object 16 during a scanning operation and still keep the position detectors 56 and 58 on the object 16. The second contact image sensor 54 may be extended slightly over the bottom edge 50 of the object 16 during a scanning operation and still keep the position detectors 56 and 58 on the object 16. Thus, all four edges 44, 46, 48, and 50 may be imaged by the contact image sensors 52 and 54 with the position detectors 56 and 58 remaining on the object 16 to enable the stitching software to join the scan swaths.

The two position detectors 56 and 58 form a line which is preferably parallel to each of the contact image sensors 52 and 54. The position detectors 56 and 58 are spaced apart by a small distance 88. The position detector spacing distance 88 is preferably as large as possible while maintaining the desired overhangs 80 and 82 of the contact image sensors 52 and 54. With the position detectors 56 and 58 aligned parallel to the contact image sensors 52 and 54 and spaced apart as great a distance 88 as possible, the portable scanner 14 is best able to detect rotation during the primary scanning motions up and down the object 16.

Alternatively, if the primary scanning motion is lateral, back and forth across the object 16, the position detectors 56 and 58 should be rotated by 90 degrees with the contact image sensors 52 and 54, as discussed above.

An exemplary scanning motion for the portable scanner 14 described above is illustrated in FIGS. 6A–6D. The scanner 14 is first positioned at the upper left corner of the object 16 (FIG. 6A), with the back side 36 of the portable scanner 14 positioned at or near the top edge 44 of the object 16, and the left side 40 of the portable scanner 14 positioned at or near the left edge 46 of the object 16. With the sides 36 and 40 of the portable scanner 14 positioned at or just over the edges 44 and 46 of the object 16, the first contact image sensor 52 will fully capture the image of the upper left corner of the object 16 and both position detectors 56 and 58 will remain on the object 16.

The portable scanner 14 may then be moved down over the object 16 in direction 90 toward the bottom left corner of the object 16 (FIG. 6B). The portable scanner 14 is positioned with the front side 38 of the portable scanner 14 positioned at or near the bottom edge 50 of the object 16, and the left side 40 of the portable scanner 14 positioned at or near the left edge 46 of the object 16. With the sides 38 and 40 of the portable scanner 14 positioned at or just over the edges 50 and 46 of the object 16, the second contact image sensor 54 will fully capture the image of the bottom left corner of the object 16 and both position detectors 56 and 58 will remain on the object 16.

The portable scanner 14 may then be moved right over the object 16 in direction 92 toward the bottom right corner of the object 16 (FIG. 6C). The portable scanner 14 is positioned with the front side 38 of the portable scanner 14 positioned at or near the bottom edge 50 of the object 16, and the right side 42 of the portable scanner 14 positioned at or near the right edge 48 of the object 16. With the sides 38 and 42 of the portable scanner 14 positioned at or just over the edges 50 and 48 of the object 16, the second contact image sensor 54 will fully capture the image of the bottom right corner of the object 16 and both position detectors 56 and 58 will remain on the object 16.

The portable scanner 14 may then be moved up over the object 16 in direction 94 toward the top right corner of the object 16 (FIG. 6D). The scanner 14 is positioned with the back side 36 of the portable scanner 14 positioned at or near the top edge 44 of the object 16, and the right side 42 of the portable scanner 14 positioned at or near the right edge 48 of the object 16. With the sides 36 and 42 of the portable scanner 14 positioned at or just over the edges 44 and 48 of the object 16, the first contact image sensor 52 will fully capture the image of the upper left corner of the object 16 and both position detectors 56 and 58 will remain on the object 16.

The dual scan swaths produced by the two contact image sensors 52 and 54 may be combined during the stitching process. Position information produced by the position detectors 56 and 58 relates equally to the two scan swaths produced by the two contact image sensors 52 and 54, although the offset between the position detectors 56 and 58 and the contact image sensors 52 and 54 may differ. Since the distance between the two contact image sensors 52 and 54 and the relative positions between them is known, the stitching software can correlate and combine the two scan swaths.

Referring now primarily to FIGS. 7–11, a second embodiment of an edge to edge image sensor and navigator system 112 having a single contact image sensor and quad-position detectors may comprise a main housing portion 122 having a top 143, bottom (not shown), left side 140, right side 142, front 138, and back 136. The main housing portion 122 has a height 166 which is less than the width 168 or depth 170 of the top 143.

The portable scanner 114 includes a display device 126, control buttons 124, 130, 132, and 134, and a printed circuit board (PCB) 164 as in previous embodiments.

An image detector 152 is located in the bottom of the main housing portion 122 of the portable scanner 114, along with any required illumination system (not shown).

A lens (not shown) may be required to direct and focus the image light (not shown) onto the contact image sensor 152, and preferably comprises a GRIN lens. The lens may be mounted to the printed circuit board 164 or to the main housing portion 122 under the contact image sensor 152 with any suitable mounting process, such as a thin layer of adhesive.

Position detectors 156, 157, 158, and 159 are also located in the bottom of the main housing portion 122 of the portable scanner 114.

The main housing portion 122 also contains one or more batteries 160 and 162 to power the portable scanner 114. The batteries 160 and 162 may be located in any suitable location in the portable scanner 114.

A single contact image sensor 152 is located near the center of the portable scanner 114 between the front and back sides 138 and 136. The contact image sensor 152 is elongated and extends between the left side 140 and the right side 142. The contact image sensor 152 may extend to or near to the left and right sides 140 and 142 of the portable scanner 114.

Two back position detectors 156 and 158 are located on the bottom of the portable scanner 114 between the contact image sensor 152 and the back side 136, a small distance 184 from the contact image sensor 152. The first back position detector 156 is located near the left side 140 of the portable scanner 114, located at or near the back side 136. The first back position detector 156 is preferably set back from the left side 140 so that the contact image sensor 152 extends a small distance 180 past the first back position detector 156 toward the left side 140. This allows the left side of the contact image sensor 152 to be extended slightly over the left edge 146 of the object 116 during a scanning operation and still keep the first back position detector 156 on the object 116.

A second back position detector 158 is located near the right side 142 of the portable scanner 114, located at or near the back side 136. The second back position detector 158 is preferably set back from the right side 142 so that the contact image sensor 152 extends a small distance 182 past the second back position detector 158 toward the right side 142. This allows the right side of the contact image sensor 152 to be extended slightly over the right edge 148 of the object 116 during a scanning operation and still keep the second back position detector 158 on the object 116.

Two front position detectors 157 and 159 are located on the bottom of the portable scanner 114 between the contact image sensor 152 and the front side 138, a small distance 186 from the contact image sensor 152. The first front position detector 157 is located near the left side 140 of the portable scanner 114, located at or near the front side 138. The first front position detector 157 is preferably set back from the left side 140 so that the contact image sensor 152 extends a small distance 180 past the first front position detector 157 toward the left side 140. This allows the left side of the contact image sensor 152 to be extended slightly over the left edge 146 of the object 116 during a scanning operation and still keep the first front position detector 157 on the object 116.

A second front position detector 159 is located near the right side 142 of the portable scanner 114, located at or near the front side 138. The second front position detector 159 is preferably set back from the right side 142 so that the contact image sensor 152 extends a small distance 182 past the second front position detector 159 toward the right side 142. This allows the right side of the contact image sensor 152 to be extended slightly over the right edge 148 of the object 116 during a scanning operation and still keep the second front position detector 159 on the object 116.

The back position detectors 156 and 158 are spaced a small distance 184 from the contact image sensor 152, and the front position detectors 157 and 159 are spaced a small distance 186 from the contact image sensor 152, with the two distances 184 and 186 preferably substantially equal. As the contact image sensor 152 is extended slightly over the top edge 144 of the object 116 during a scanning operation, the back position detectors 156 and 158 will move off the object 116, but the front position detectors 157 and 159 will remain on the object 116. As the contact image sensor 152 is extended slightly over the bottom edge 150 of the object 116 during a scanning operation, the front position detectors 157 and 159 will move off the object 116, but the back position detectors 156 and 158 will remain on the object 116. Thus, all four edges 144, 146, 148, and 150 may be imaged by the contact image sensor 152 with at least two of the position detectors 156, 157, 158, and 159 remaining on the object 116 at all times to enable the stitching software to join the scan swaths.

The two back position detectors 156 and 158 form a line which is preferably parallel to the contact image sensor 152. The two front position detectors 157 and 159 also form a line which is parallel to the contact image sensor 152. The back position detectors 156 and 158 are spaced apart by a small distance 188, as are the front position detectors 157 and 159. The position detector spacing distance 188 is preferably as large as possible while maintaining the desired overhangs 180 and 182 of the contact image sensor 152.

An exemplary scanning motion for the portable scanner 114 described above is illustrated in FIGS. 11A–11D. The scanner 114 is first positioned with the contact image sensor 152 at the upper left corner of the object 116 (FIG. 11A), with the back side 136 of the portable scanner 114 extended over the top edge 44 of the object 116, and the left side 140 of the portable scanner 114 positioned at or near the left edge 146 of the object 116. In this position, the two back position sensors 156 and 158 are off the object 116, but the two front position sensors 157 and 159 remain on the object 116. In this position, the contact image sensor 152 will fully capture the image of the upper left corner of the object 116.

Figure 11A:
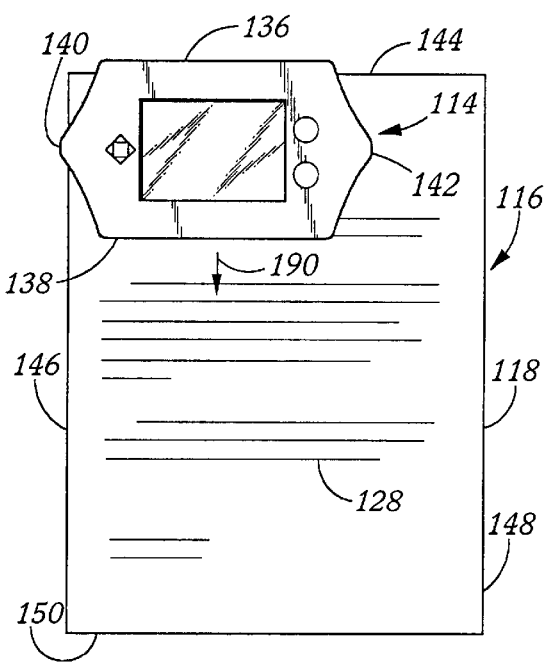
FIGS. 11A–11D are top views illustrating the placement of the portable scanner of FIG. 7 over the corners of a document in order to obtain full page coverage.
Figure 11B:
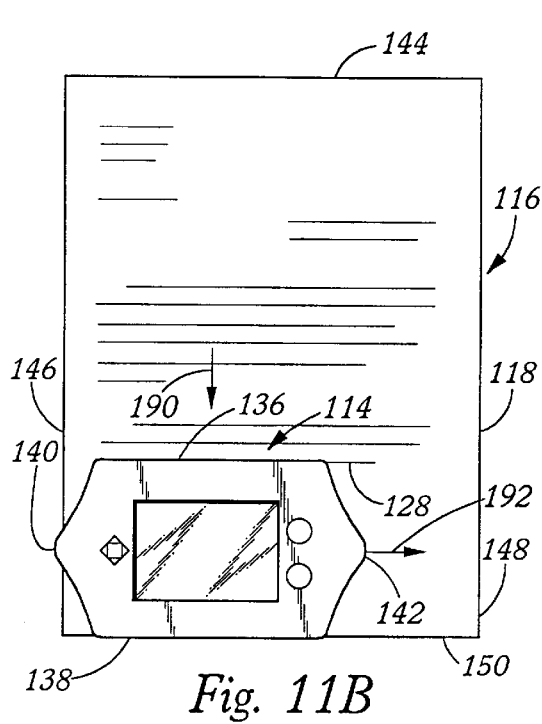

The portable scanner 114 may then be moved down over the object 116 in direction 190 toward the bottom left corner of the object 116 (FIG. 11B). The portable scanner 114 is positioned with the front side 138 of the portable scanner 114 extended over the bottom edge 150 of the object 116 so that the contact image sensor 152 is at or near the bottom edge 150. The left side 140 of the portable scanner 114 is positioned at or near the left edge 146 of the object 116. In this position, the contact image sensor 152 will fully capture the image of the bottom left corner of the object 116 and the back position detectors 156 and 158 will remain on the object 116, although the front position detectors 157 and 159 will not be on the object 116.

Figure 11C:
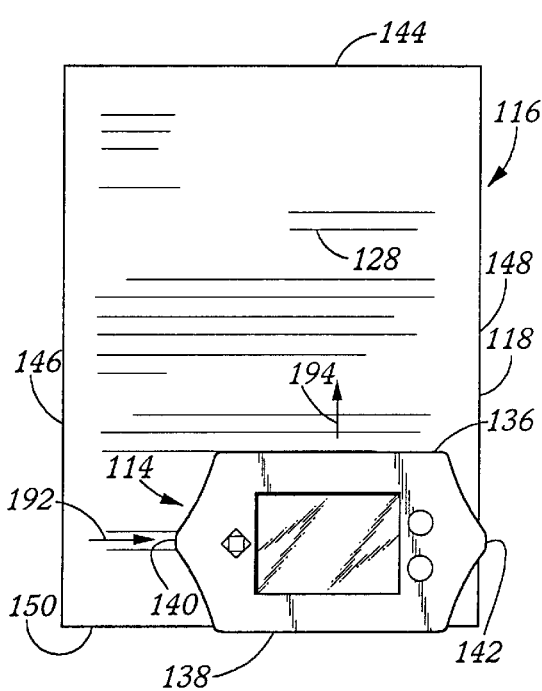

The portable scanner 114 may then be moved right over the object 116 in direction 192 toward the bottom right corner of the object 116 (FIG. 11C). The portable scanner 114 is positioned with the front side 138 of the portable scanner 114 extending over the bottom edge 150 of the object 116 so that the contact image sensor 152 is at or near the bottom edge 150. The right side 142 of the portable scanner 114 is positioned at or near the right edge 148 of the object 116. In this position, the contact image sensor 152 will fully capture the image of the bottom right corner of the object 116 and both back position detectors 156 and 158 will remain on the object 116, although the front position detectors 157 and 159 will not be on the object 116.

Figure 11D:
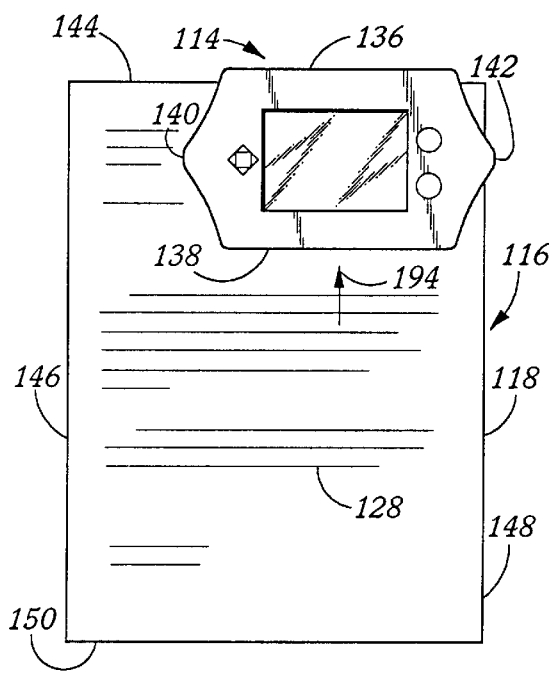

The portable scanner 114 may then be moved up over the object 116 in direction 194 toward the top right corner of the object 116 (FIG. 11D). The scanner 114 is positioned with the back side 136 of the portable scanner 114 extending over the top edge 144 of the object 116 so that the contact image sensor 152 is at or near the top edge 144. The right side 142 of the portable scanner 114 is positioned at or near the right edge 148 of the object 116. In this position, the contact image sensor 152 will fully capture the image of the upper right corner of the object 116 and both front position detectors 157 and 159 will remain on the object 116, although the back position detectors 156 and 158 will not be on the object 116.

The position information from the four position detectors 156, 157, 158, and 159 is combined in the same way the position information from two position detectors is combined in order to identify the position and orientation of a scan swath.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A portable scanner, comprising:
a first image detector;
a second image detector placed in spaced apart relation to said first image detector; and
a plurality of position detectors located between said first image detector and said second image detector for detecting a position of said portable scanner.

2. The portable scanner of claim 1, wherein said first image detector and said second image detector comprise linear arrays of photodetectors.

3. The portable scanner of claim 1, wherein said first image detector comprises a first contact image sensor and said second image detector comprises a second contact image sensor.

4. The portable scanner of claim 3, wherein said first contact image sensor comprises a first linear array of photodetectors, and said second contact image sensor comprises a second linear array of photodetectors, and wherein said first contact image sensor is parallel to said second contact image sensor.

5. The portable scanner of claim 1, wherein said plurality of position detectors comprise two optical position detectors, and wherein said two optical position detectors form a line which is parallel to said first image detector and said second image detector.

6. The portable scanner of claim 1, wherein said plurality of position detectors comprise optical imaging position detectors.

7. The portable scanner of claim 6, wherein said optical imaging position detectors comprise two dimensional arrays of photodetectors.

8. The portable scanner of claim 1, wherein said plurality of position detectors comprise mechanical position detectors.

9. The portable scanner of claim 1, wherein said plurality of position detectors comprises two position detectors.

10. The portable scanner of claim 1, wherein said first and second image detectors comprise charge coupled devices.

11. The portable scanner of claim 1, wherein said first and second image detectors comprise CMOS devices.

12. The portable scanner of claim 1, further comprising a printed circuit board, wherein said first and second image detectors and said plurality of position detectors are mounted on and electrically connected to said printed circuit board.

13. The portable scanner of claim 1, further comprising a planar display panel positioned adjacent said first and second image detectors and said plurality of position detectors, wherein said first and second image detectors and said plurality of position detectors lie substantially in a plane, and said planar display panel is oriented substantially parallel to said plane.

14. A portable scanner, comprising:

an image detector having a first side and a second side opposite said first side;

a first plurality of position detectors located adjacent said first side of said image detector; and a second plurality of position detectors located adjacent said second side of said image detector.

15. The portable scanner of claim 14, wherein said image detector comprises a linear array of photodetectors.

16. The portable scanner of claim 14, wherein said image detector comprises a contact image sensor.

17. The portable scanner of claim 14, wherein said image detector comprises a charge coupled device.

18. The portable scanner of claim 14, wherein said image detector comprises a CMOS device.

19. The portable scanner of claim 14, wherein said first and said second plurality of position detectors comprise optical image sensors for detecting a position of said portable scanner.

20. The portable scanner of claim 14, wherein said first and said second plurality of position detectors comprise mechanical position detectors.

21. The portable scanner of claim 14, wherein said image detector is elongated along a first axis, and said first plurality of position detectors are linearly arranged along a second axis, and said second plurality of position detectors are linearly arranged along a third axis, wherein said first axis and said second axis and said third axis are located in parallel, spaced apart relation.

22. The portable scanner of claim 14, wherein said first plurality of position detectors comprises two position detectors, and wherein said second plurality of position detectors comprises two position detectors.

23. The portable scanner of claim 21, wherein a first end of said contact image sensor extends beyond said first plurality of position detectors and said second plurality of position detectors in a first direction, and wherein a second end of said contact image sensor extends beyond said first plurality of position detectors and said second plurality of position detectors in a second direction, wherein said first direction is opposite said second direction and said first and second directions are parallel to said first axis.

24. The portable scanner of claim 14, further comprising a printed circuit board, wherein said image detector and said first plurality of position detectors and second plurality of position detectors are mounted on and electrically connected to said printed circuit board.

25. The portable scanner of claim 14, further comprising a planar display panel positioned adjacent said image detector and said first plurality of position detectors and second plurality of position detectors, wherein said first plurality of position detectors and said second plurality of position detectors form a plane, and said planar display panel is oriented substantially parallel to said plane.

26. A portable scanner comprising:

first means for detecting an optical image of an object;

second means for detecting an optical image of an object; and a plurality of means positioned between said first and second means for detecting an optical image, said plurality of means for detecting a position of said portable scanner.

27. A method for document imaging with a portable scanner comprising:

a. detecting an image with a first detector at a first position;

b. detecting an image with a second detector at a second position; and c. detecting a position with a position detector located between said first and second detectors.

* * * * *